(12) United States Patent
Buchmueller et al.

(10) Patent No.: US 10,771,939 B1
(45) Date of Patent: Sep. 8, 2020

(54) ORIENTATION OF DIRECTIONAL ANTENNAS USING HORIZONTAL POSITION INFORMATION

(71) Applicant: Amazon Technologies, Inc., Seattle, WA (US)

(72) Inventors: Daniel Buchmueller, Seattle, WA (US); Ronald Joseph Degges, Jr., Los Gatos, CA (US); Jin Dong Kim, Seattle, WA (US); Gur Kimchi, Seattle, WA (US); Sang Eun Lee, San Jose, CA (US); Subram Narasimhan, Saratoga, CA (US); Koohyun Um, Sunnyvale, CA (US)

(73) Assignee: Amazon Technologies, Inc, Seattle, WA (US)

( * ) Notice: Subject to any disclaimer, the term of this patent is extended or adjusted under 35 U.S.C. 154(b) by 0 days.

(21) Appl. No.: 16/175,377

(22) Filed: Oct. 30, 2018

Related U.S. Application Data

(62) Division of application No. 15/416,713, filed on Jan. 26, 2017, now Pat. No. 10,149,115, which is a division of application No. 14/711,737, filed on May 13, 2015, now Pat. No. 9,590,298.

(51) Int. Cl.
| | |
|---|---|
| *H04W 4/44* | (2018.01) |
| *H04W 76/10* | (2018.01) |
| *H01Q 3/08* | (2006.01) |
| *H04B 1/3822* | (2015.01) |
| *H01Q 1/28* | (2006.01) |

(52) U.S. Cl.
CPC ............... *H04W 4/44* (2018.02); *H01Q 1/28* (2013.01); *H01Q 3/08* (2013.01); *H04B 1/3822* (2013.01); *H04W 76/10* (2018.02)

(58) Field of Classification Search
CPC ..................................................... H04W 4/44
USPC ............................................................ 375/220
See application file for complete search history.

(56) References Cited

U.S. PATENT DOCUMENTS

| | | | |
|---|---|---|---|
| 6,377,211 B1 | 4/2002 | Hsiung | |
| 7,072,977 B1* | 7/2006 | Bernard | B64D 11/0015 709/238 |
| 8,463,464 B2* | 6/2013 | Gustafsson | G05D 1/104 701/4 |
| 8,503,941 B2 | 8/2013 | Erdos et al. | |
| 2006/0020976 A1* | 1/2006 | Takagi | H04N 5/4401 725/72 |
| 2010/0161831 A1 | 6/2010 | Haas et al. | |
| 2012/0015684 A1 | 1/2012 | Noji | |

(Continued)

*Primary Examiner* — Lihong Yu

(74) *Attorney, Agent, or Firm* — Athorus, PLLC

(57) ABSTRACT

Systems, methods, and apparatus are provided for enabling orientation of directional antennas even when one or more of the directional antennas are moving. Position information for each directional antenna is transmitted using an omnidirectional antenna transmitting at a low bandwidth and a low power. The position information of the directional antennas is used to orient the directional antennas so that a high bandwidth, low power wireless connection can be enabled and/or maintained between the directional antennas. The position information is periodically transmitted and the orientation of the directional antennas is updated as one or more of the directional antennas move so that the wireless connection between the directional antennas is maintained.

23 Claims, 8 Drawing Sheets

(56) References Cited

U.S. PATENT DOCUMENTS

| | | | |
|---|---|---|---|
| 2012/0235863 A1* | 9/2012 | Erdos | H01Q 3/00 |
| | | | 342/359 |
| 2012/0299373 A1 | 11/2012 | Yoshida | |
| 2014/0105054 A1 | 4/2014 | Saegrov et al. | |
| 2014/0210646 A1* | 7/2014 | Subramanya | B61L 29/28 |
| | | | 340/928 |
| 2015/0078361 A1* | 3/2015 | Koos | H04W 76/10 |
| | | | 370/338 |

* cited by examiner

ORIENTATION OF DIRECTIONAL ANTENNAS USING HORIZONTAL POSITION INFORMATION

CROSS-REFERENCE TO RELATED APPLICATION

This application is a divisional of and claims the benefit of U.S. Utility application Ser. No. 15/416,713, filed Jan. 26, 2017, which is a divisional of and claims the benefit of U.S. Utility application Ser. No. 14/711,737, filed May 13, 2015, entitled "Orientation of Directional Antennas," each of which is incorporated by reference herein in its entirety.

BACKGROUND

Wireless communication and data transmission has become ubiquitous with multiple types of wireless networks, including Wi-Fi, cellular, satellite, etc. Wireless connections are also used to transmit data over long distances. Typically, long-distance wireless communication that enables high data rate transmission is accomplished with high-gain directional antennas. The gain of the antenna is a measure of increase in power that the antenna adds to the wireless signal. The direction of the antenna is the shape of the radiation pattern created by the antenna, which is typically measured in degrees and referred to as beamwidths. The beamwidth of a directional antenna generally includes a main lobe and one or more side lobes.

As the gain of an antenna increases, the beamwidth of the antenna decreases. Thus, the higher the gain of the antenna, the smaller the beamwidth. A higher gain provides a greater coverage distance of the main lobe, but reduced coverage angle (beamwidth). To transmit over longer distances (e.g., greater than 20 kilometers), directional antennas must be oriented so that the receiving antenna is within the main lobe of the transmitting antenna. This is typically accomplished by mounting both the transmitting and receiving antennas at fixed locations and having operators at each antenna orient the antennas toward one another by measuring the signal strength between the antennas. When an orientation with the highest signal strength between the antennas is determined, the antennas are secured to the fixed locations so that wireless connection between the antennas may be established and maintained.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
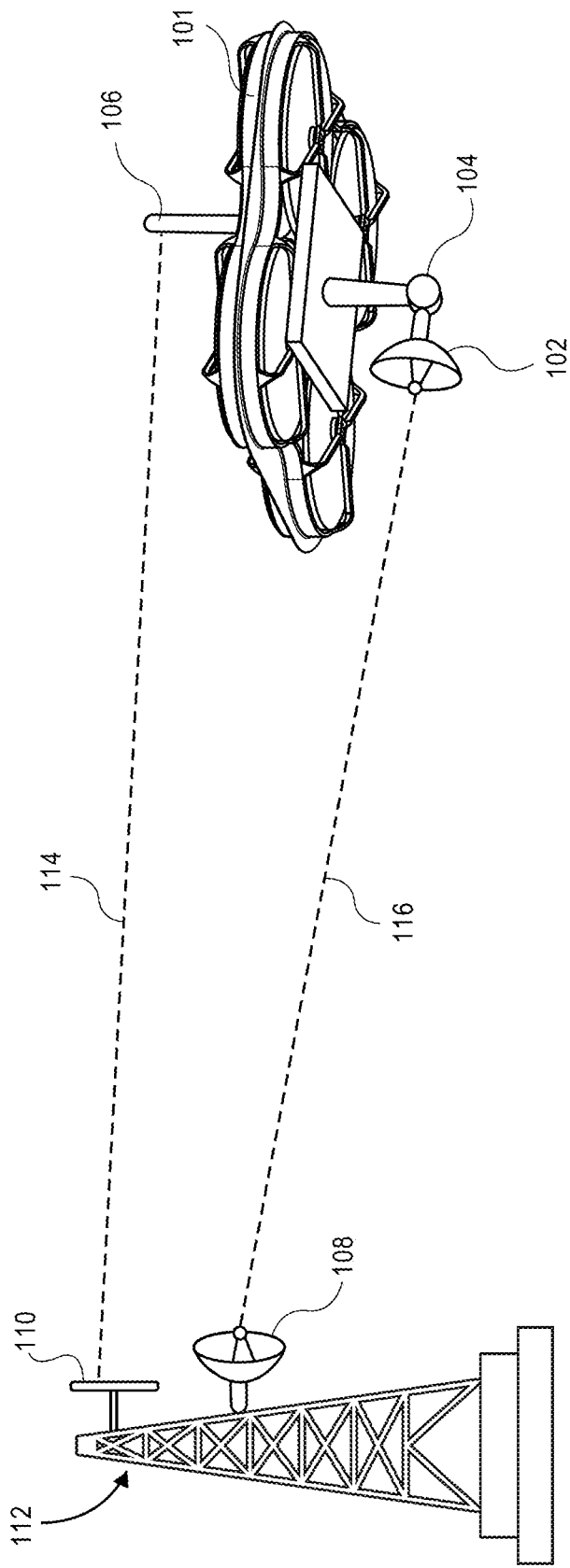
FIG. 1 is a diagram illustrating a fixed location directional antenna communicating with a moving directional antenna, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

Described are systems, methods, and apparatus for dynamically orienting two or more directional antennas, even when one or more of those directional antennas are moving. Position information for each directional antenna is transmitted using an omnidirectional antenna transmitting at a low bandwidth and a low power. Position information, as used herein, includes at least one of an approximate horizontal position (i.e., latitude, longitude), an approximate altitude (i.e. the position above or below the "horizon"), an approximate angle relative to the "horizon", and/or an approximate orientation about an axis perpendicular to the "horizon." For example, position information of an antenna may include the approximate horizontal position (latitude, longitude), the approximate altitude of the antenna, the approximate angle of the antenna, and the approximate orientation of the antenna.

Position information of directional antennas transmitted/received with omnidirectional antennas is used to orient the directional antennas so that a high bandwidth, low power wireless connection can be enabled and/or maintained between the directional antennas. As used herein, a "high bandwidth" connection may be any connection having greater than 10 megabits per second data transfer rate. Likewise, a "low bandwidth" connection, as used herein is intended to mean any connection having less than approximately 10 megabits per second data transfer rate. The position information is periodically transmitted and the orientation of the directional antennas is updated as one or more of the directional antennas move so that the wireless connection between the directional antennas is maintained.

In some implementations, one of the directional antennas may be at a fixed location and one of the directional antennas may be coupled to a moving vehicle, such as an unmanned aerial vehicle ("UAV"). As the vehicle moves, the position information of the vehicle is provided to the fixed location so that the orientation of the fixed location directional antenna may be adjusted to remain oriented toward the directional antenna coupled to the vehicle. Likewise, an antenna orientation controller of the vehicle may utilize the position information of the directional antenna coupled to the vehicle and the known position information for the fixed location antenna to adjust the orientation of the directional antenna coupled to the vehicle so that it remains oriented toward the fixed location directional antenna.

In some implementations, both directional antennas may be moving. For example, each directional antenna may be coupled to a different vehicle. In such an example, each vehicle may transmit respective position information relating to the directional antenna coupled to that vehicle. Likewise, the antenna orientation controller of each vehicle may utilize the position information for the directional antenna coupled to that vehicle and the position information for the directional antenna coupled to the second vehicle to orient the directional antenna of that vehicle with the directional antenna of the second vehicle.

FIG. 1 is a diagram illustrating a fixed location directional antenna 108 communicating with a moving high-gain directional antenna 102, according to an implementation. In this example, the fixed location directional antenna 108 is mounted to a tower at a remote location 112. While a tower is illustrated in FIG. 1, it will be appreciated that a fixed location directional antenna may be coupled to any stationary object (e.g., tower, building, and pole). The moving directional antenna 102 is coupled to a vehicle, in this example a UAV 101. While a UAV is illustrated in FIG. 1, it will be appreciated that a moving directional antenna may be coupled to any moving object (e.g., UAV, aerial vehicle, unmanned ground based vehicle, ground based vehicle, an unmanned water based vehicle, and a water based vehicle).

If a high bandwidth wireless connection with the UAV 101 is to be established but the distance between the remote location 112 and the UAV 101 is such that a typical high bandwidth wireless connection (e.g., Wi-Fi) is not available, the UAV 101 may transmit to the remote location 112, using the omnidirectional antenna 106, position information for the directional antenna 102 coupled to the UAV 101. As discussed above, the position information may include one or more of the approximate horizontal position (e.g., latitude, longitude), approximate altitude, approximate angle, and/or approximate orientation of the directional antenna coupled to the UAV 101. The angle and/or orientation of the directional antenna may be maintained by the antenna orientation component of the UAV 101. The horizontal position and/or altitude may be determined, for example, based on the horizontal position and altitude information obtained from the navigation system of the vehicle control system (discussed below with respect to FIG. 7). For example, the navigation system may receive global positioning system (GPS) information that identifies the horizontal position of the UAV 101. Likewise, the navigation system may include an altimeter that is used to determine the approximate altitude of the UAV 101. The horizontal position of the UAV may be utilized as the horizontal position of the directional antenna coupled to the UAV. For example, the directional antenna may be coupled at a location on the UAV that is approximately in-line with the GPS receiver of the UAV 101 so that the determined horizontal position of the UAV 101 corresponds with the approximate horizontal position of the directional antenna. In other implementations, the offset between the location of the GPS receiver and the directional antenna may be known and the determined horizontal position of the UAV may be adjusted by the known offset to determine the approximate horizontal position of the directional antenna. In still another implementation, the determined horizontal position of the UAV may be utilized as the approximate horizontal position of the directional antenna regardless of where on the UAV the directional antenna is coupled.

Likewise, the navigation system may include an altimeter that is used to determine the approximate altitude of the UAV 101. For example, the directional antenna may be coupled at a location on the UAV that is a known distance from the altimeter and the determined altitude of the UAV may be adjusted by the known difference to determine the approximate altitude of the directional antenna. In still another implementation, the determined altitude of the UAV may simply be utilized as the approximate altitude of the directional antenna regardless of where on the UAV the directional antenna is coupled.

Because of the distance between the remote location 112 and the UAV 101, the position information of the directional antenna 102 coupled to the UAV 101 is initially transmitted via a wireless connection 114 between the omnidirectional antenna 106 of the UAV and the omnidirectional antenna 110 of the remote location 112. As is known, an omnidirectional antenna radiates in a 360-degree pattern and can transmit information, at a low bandwidth, over long distances. For example, the omnidirectional antenna may be configured to transmit in the 900-Megahertz ("MHz") industrial, scientific, and medical (ISM) band at 10 kilobits per second ("kbs"). In such a configuration, the omnidirectional antenna is able to transmit the position information to distances exceeding sixty kilometers.

When the position information of the UAV 101 is received by the omnidirectional antenna 110 at the remote location 112, an antenna orientation controller may orient the directional antenna 108 toward the position of the directional antenna 102 so that the directional antenna 102 is in the main lobe of the directional antenna 108. Likewise, the antenna orientation controller of the UAV 101 orients the directional antenna 102 toward the position of the fixed location directional antenna 108 so that the directional antenna 108 is in the main lobe of the moving directional antenna 102. In some implementations, directional antennas 102, 108 may be mechanically oriented such that the directional antennas are physically positioned to correspond to the desired orientation. For example, the directional antenna 102 may be coupled to the UAV 101 with a gimbal 104. The antenna orientation controller of the UAV 101 may determine the desired orientation of the directional antenna 102 and orient the antenna by adjusting the position of the gimbal and/or by reorienting the UAV 101.

In other implementations, the directional antennas may be electronically steerable such that the direction of the main lobe may be altered electronically. In such an implementation, the directional antenna may be an electronically steerable phased array antenna that is mounted onto and/or incorporated into the frame of the UAV 101. In other implementations, the directional antennas may be oriented using a combination of mechanical movement and electronically steerable orientation of the directional antennas.

Once the directional antennas 102, 108 are oriented, a high bandwidth wireless connection 116 may be established between the directional antennas 102, 108 so that data can be transmitted between the UAV 101 and the remote location 112. For example, the high bandwidth wireless connection may be established in the 5.8 gigahertz ("GHz") ISM band.

As the UAV 101 moves, the position information for directional antenna 102 coupled to the UAV 101 may be periodically determined and sent to the remote location 112 so that the orientation of the directional antenna 108 at the remote location can be adjusted. By adjusting the directional antenna 108 of the remote location 112 as the UAV 101 moves, the wireless connection 116 between the directional antenna 108 at the remote location 112 and the directional antenna 102 of the UAV 101 is maintained. Likewise, the antenna orientation controller of the UAV 101 may utilize the updated position information of the UAV 101 and the known position information of the fixed location to adjust the orientation of the directional antenna 102 of the UAV.

After a wireless connection 116 between remote location 112 and the UAV 101 has been established between the directional antenna 108 and the directional antenna 102, the position information of the directional antenna 102 of the UAV 101 may be periodically sent using the omnidirectional antenna 106 and/or using the wireless connection 116 between the directional antennas 108, 102. In some implementations, the position information of the directional antenna 102 of the UAV 101 may be sent at defined intervals (e.g., every second, every two seconds). In other implementations, the position information may be continuously transmitted from the UAV 101 to the remote location 112 using the high bandwidth wireless connection 116 once established.

Figure 2:
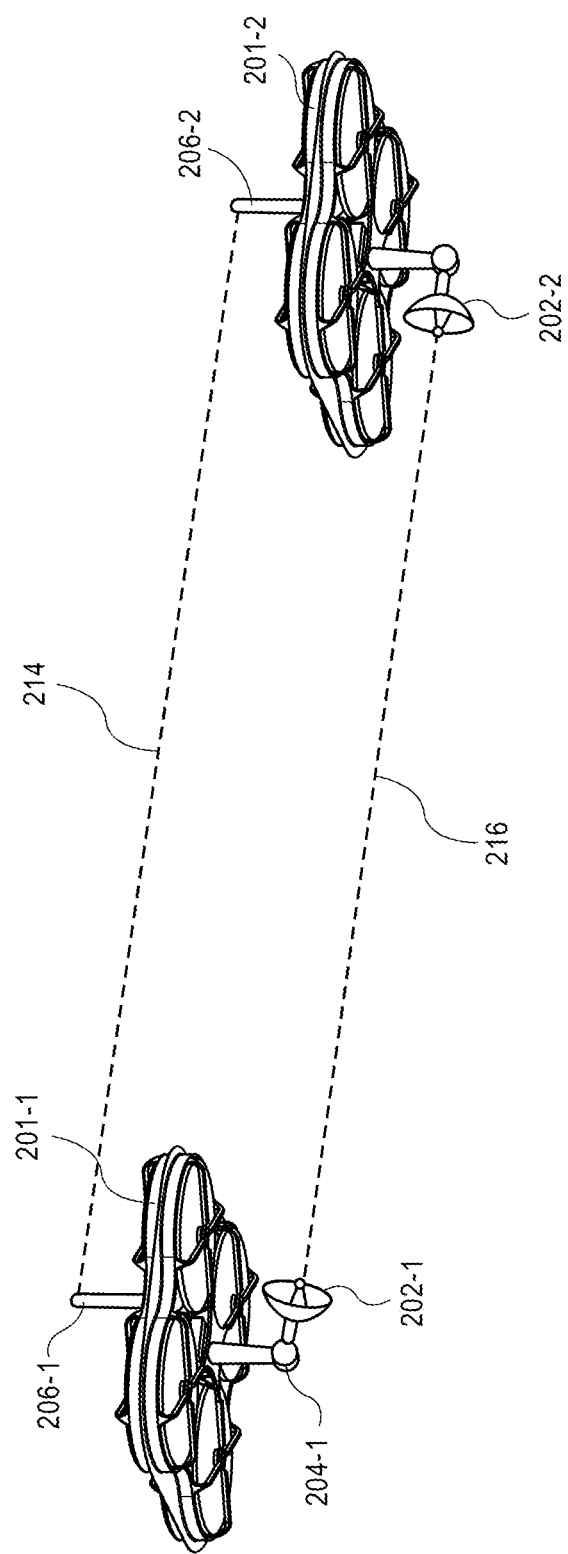
FIG. 2 is a diagram illustrating communication between two moving directional antennas, according to an implementation.

FIG. 2 is a diagram illustrating communication between two moving directional antennas 202-1, 202-2, according to an implementation. Similar to the example discussed above with respect to FIG. 1, position information of the first vehicle, in this example UAV 201-1, is transmitted using an omnidirectional antenna 206-1 and received at an omnidirectional antenna of a second vehicle, in this example omnidirectional antenna 206-2 and UAV 201-2. Likewise, position information of the second UAV 201-2 is transmitted using the omnidirectional antenna 206-2 and received at the omnidirectional antenna 206-1 of the first UAV 201-1. Each UAV 201 utilizes the received position information of the other vehicle and their own determined position to orient the directional antenna 202 coupled to that vehicle. For example, the antenna orientation controller of the first UAV 201-1 receives at the omnidirectional antenna 206-1 the position information of the second directional antenna 202-2 of the second UAV 201-2. The antenna orientation controller of the first UAV 201-1 determines from the vehicle control system (FIG. 7) the position information of the first directional antenna 202-1 coupled to the first UAV 201-1. Based on the position information of the first directional antenna 202-1 and the position information of the second directional antenna 202-2, the antenna orientation controller determines a desired orientation for the first directional antenna 202-1 and causes the first directional antenna to be oriented according to the determined desired orientation. As discussed above, the orientation of the first directional antenna 202-1 may be done mechanically by adjusting the position of the UAV 201-1 and/or by altering the orientation of the first directional antenna using a gimbal 204-1 or other mechanical component that couples the first directional antenna 202-1 to the UAV 201-1. Alternatively, or in addition thereto, the first directional antenna may be an electronically steerable antenna such that the direction of the main lobe of the antenna may be electronically adjusted.

Continuing with the example, the antenna orientation controller of the second UAV 201-2 receives from the second omnidirectional antenna 206-2 the position information of the first directional antenna 202-1 and receives from the vehicle control system of the second UAV 201-2 the position information of the second directional antenna 202-2. Based on the position information of the directional antennas 202, the antenna orientation controller of the second UAV 201-2 orients the second directional antenna so that the first directional antenna is in the main lobe of the second directional antenna 202-2. Like the first directional antenna 202-1, orientation of the second directional antenna 202-2 may be done mechanically, electronically, and/or using a combination of mechanical and electronic orientation.

In some implementations, the two UAVs may temporarily hold a position so that orientation and connection of the directional antennas 202 can be established. Likewise, the UAVs 201 may transmit position information in an alternating manner. For example, the first UAV 201-1 may transmit position information on odd seconds and the second UAV 201-2 may transmit position information on even seconds. To synchronize the clocks of the UAVs 201, both UAVs may utilize clock information received by the vehicle control system, such as GPS clock signals.

Once the high bandwidth wireless connection 216 is established between the directional antennas 202, it may be maintained as the UAVs move by adjusting the orientation of the two directional antennas. For example, each UAV 201 may continue transmitting position information using a wireless connection 214 between the omnidirectional antennas 206 and the receiving UAV may utilize that information to update the orientation of the connected directional antenna. In other implementations, once a wireless connection 216 is established between the first directional antenna 202-1 of the first UAV 201-1 and the second directional antenna 202-2 of the second UAV 201-2, updated position information may be transmitted between the UAVs 201 using the high bandwidth wireless connection 216.

Figure 3:
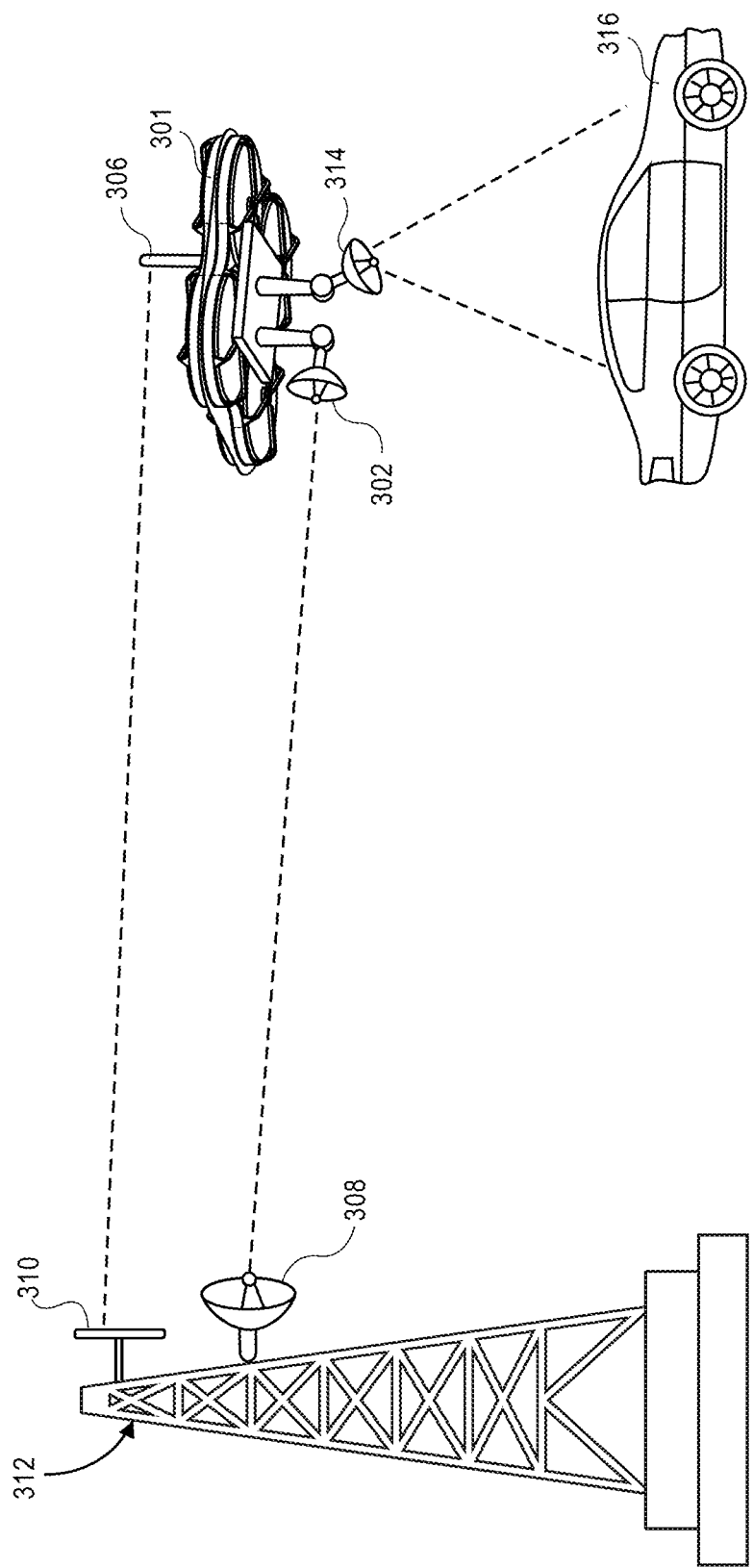
FIG. 3 is a diagram illustrating a multi-point data transmission, according to an implementation.

FIG. 3 is a diagram illustrating a multi-point data transmission, according to an implementation. Similar to the discussion above with respect to FIG. 1, a vehicle, such as a UAV 301, may transmit position information using an omnidirectional antenna 306. That position information is received at a remote location 312 by another omnidirectional antenna 310 and an antenna orientation controller is used to orient the directional antenna 308 toward the directional antenna 302 of the UAV 301. Likewise, the antenna orientation controller of the UAV 301 utilizes the position information of the fixed location directional antenna 308 and the determined position of the directional antenna 302 coupled to the UAV 301 to orient the directional antenna 302 toward the directional antenna 308 at the fixed location. Once oriented, a high bandwidth wireless connection can be established between the directional antenna 302 of UAV 301 and the directional antenna 308 of the remote location 312. Likewise, the high bandwidth wireless connection may be maintained by periodically sending updated position information for the directional antenna 302 of the UAV 301 and adjusting the orientation of the directional antennas 308, 302 so that each directional antenna 308, 302 remains in the main lobe of the other directional antenna 308, 302.

By establishing and maintaining a high bandwidth wireless connection between the UAV 301 and the remote location 312, data can be quickly transmitted to or received from the UAV 301. Likewise, as illustrated, data can be transmitted to multiple locations. For example, as illustrated, data can be transmitted from the remote location 312 to the UAV 301 over the high bandwidth wireless connection and then transmitted from the UAV 301 to another location, such as another vehicle 316. The additional transmissions may be long distance high bandwidth connections that utilize directional antennas, may be shorter distance high bandwidth connections, etc. As illustrated in FIG. 3, the connection between the remote location 312 and the UAV 301 is a high bandwidth wireless connection between two directional antennas that maintain the connection by periodically adjusting the orientation of the directional antennas 308, 302 based on updated position information. The wireless connection between the UAV 301 and the vehicle 316 is a traditional Wi-Fi connection that allows high bandwidth delivery of data between the UAV 301 and the vehicle 316. In other implementations, the connection between the UAV 301 and the vehicle 316 may be a high bandwidth wireless connection that utilizes directional antennas in which the orientation of those antennas is updated to maintain the wireless connection there between. For example, the UAV 301 may be at a high altitude above the vehicle 316 such that a Wi-Fi connection is not available. In such an instance, the directional antenna 314 may be utilized to establish a wireless connection with the vehicle 316, using the implementations discussed herein.

In the example illustrated in FIG. 3, a high definition Blu-ray movie is transmitted from the remote location 312 to the UAV 301 via the high bandwidth wireless connection established between the remote location 312 and the UAV 301. Likewise, the UAV 301 transmits the Blu-ray movie to the vehicle 316. In such a configuration, a passenger in the vehicle 316 may receive a streaming Blu-ray movie as the vehicle 316 is traveling.

Figure 4:
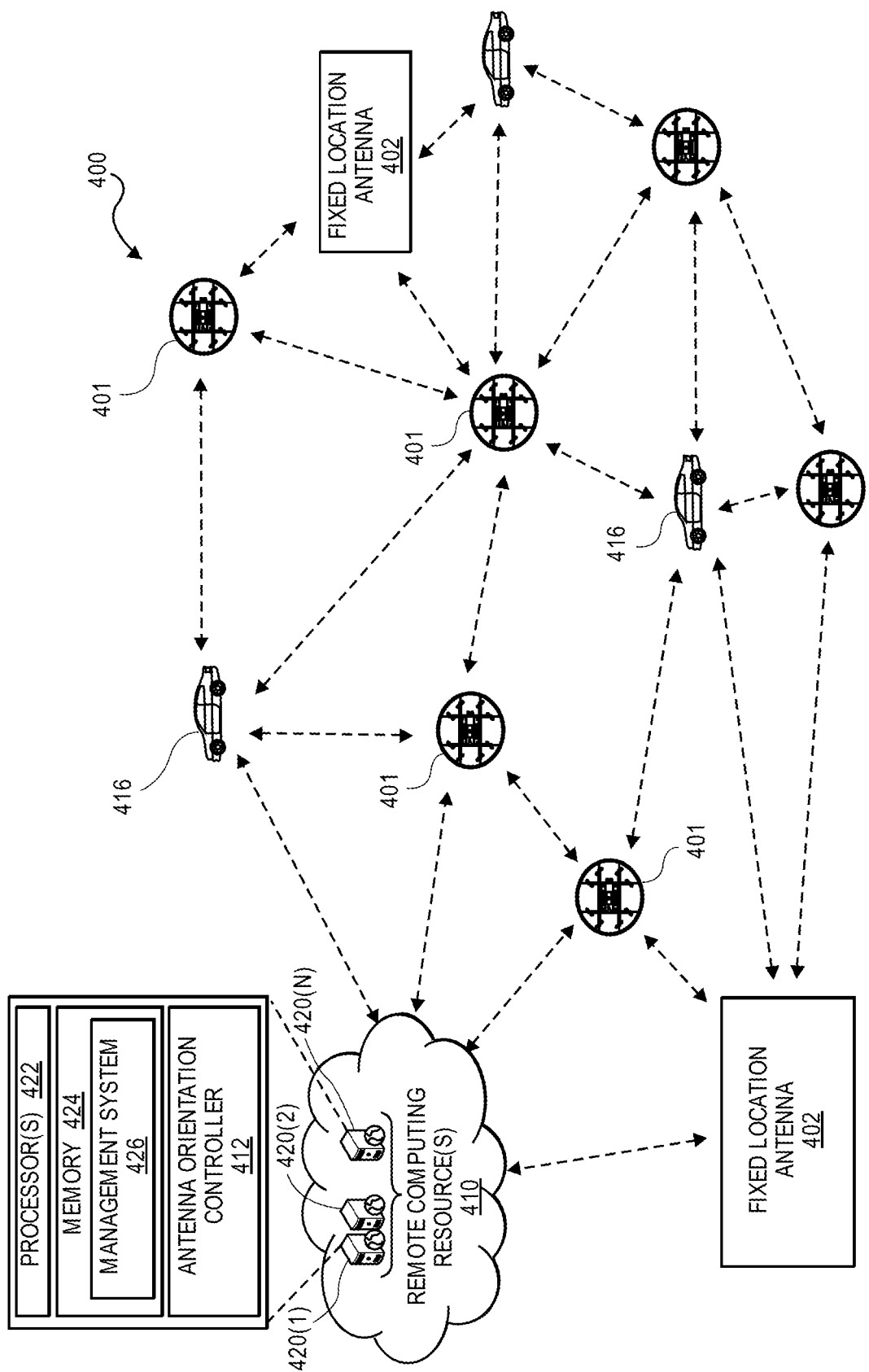
FIG. 4 is another example illustrating multi-point data transmission, according to an implementation.

FIG. 4 is another example illustrating multi-point data transmissions, according to an implementation. In the illustrated example, there are multiple vehicles 401, 416, and multiple fixed location antennas 402 each of which are in wireless connection with at least one other vehicle 401, 416 and/or a fixed location antenna 402. As will be appreciated, any number and configuration of vehicles 401, 416 and/or fixed location antennas 402 may be utilized to wirelessly transmit data. Each of the vehicles 401, 416, fixed location antennas 402, and/or remote computing resources 410 are configured to communicate with one another. For example, the vehicles 401, 416 may be configured to establish and maintain high bandwidth wireless connections using directional antennas according to the implementations discussed herein. Likewise, if the vehicles 401, 416 are within an operating distance of one another, they may be configured to establish and maintain a wireless connection using other forms of wireless connectivity, such as Wi-Fi, Bluetooth, near field communication ("NFC"), etc.

In other implementations, the vehicles 401, 416, management system 426, and/or fixed location antennas 402 may utilize existing wireless networks (e.g., cellular, Wi-Fi, satellite) to transmit position information for use in orienting the directional antennas. In some implementations, one or more of the remote computing resources 410, and/or fixed location antennas 402, may also communicate with each other via another network (wired and/or wireless), such as the Internet.

The remote computing resources 410 may form a portion of a network-accessible computing platform implemented as a computing infrastructure of processors, storage, software, data access, and other components that is maintained and accessible via a network. As illustrated, the remote computing resources 410 may include one or more servers, such as servers 420(1), 420(2) . . . 420(N). These servers 420(1)-(N) may be arranged in any number of ways, such as server farms, stacks, and the like that are commonly used in data centers. Furthermore, the servers 420(1)-(N) may include one or more processors 422 and memory 424 that may store a management system 426 and/or an antenna orientation controller 412 that is used to orient fixed location antennas 402, such as the fixed location antennas at remote locations 112 (FIG. 1) or 312 (FIG. 3).

The management system 426 may be configured, for example, to communicate with the fixed location antennas 402, vehicles 401, 416, materials handling facilities and/or other facilities.

In some implementations, if a vehicle loses wireless connection with other vehicles via a high bandwidth connection between directional antennas, the vehicle may activate another wireless connection path to regain connection. For example, if a vehicle loses connection with other vehicles, it may activate a cellular and/or satellite communication path to obtain communication information from the management system 426, and/or a fixed location antenna 402. In some implementations, the vehicle may receive position instructions that identify a horizontal position, altitude, antenna angle and/or antenna orientation that are to be executed by the vehicle. In such an example, the UAV may execute the position instructions. Likewise, another vehicle and/or a fixed location antenna may orient a directional antenna in a position that corresponds with the delivered position instructions so that the vehicle can wirelessly connect with another directional antenna.

The connections between the vehicles 401, 416, fixed location antennas 402, and remote computing resources 410 may be used to provide communication (e.g., to share weather information, environment information, location information, routing information, data) between vehicles, the management system 426, materials handling facilities, and/or other locations. Likewise, in some implementations, the wireless connections, and/or the vehicles 401, 416 may be used to provide coverage for other computing resources, such as personal computers, electronic book reading devices, audio players, mobile telephones, tablets, desktops, laptops, etc.

Figure 5:
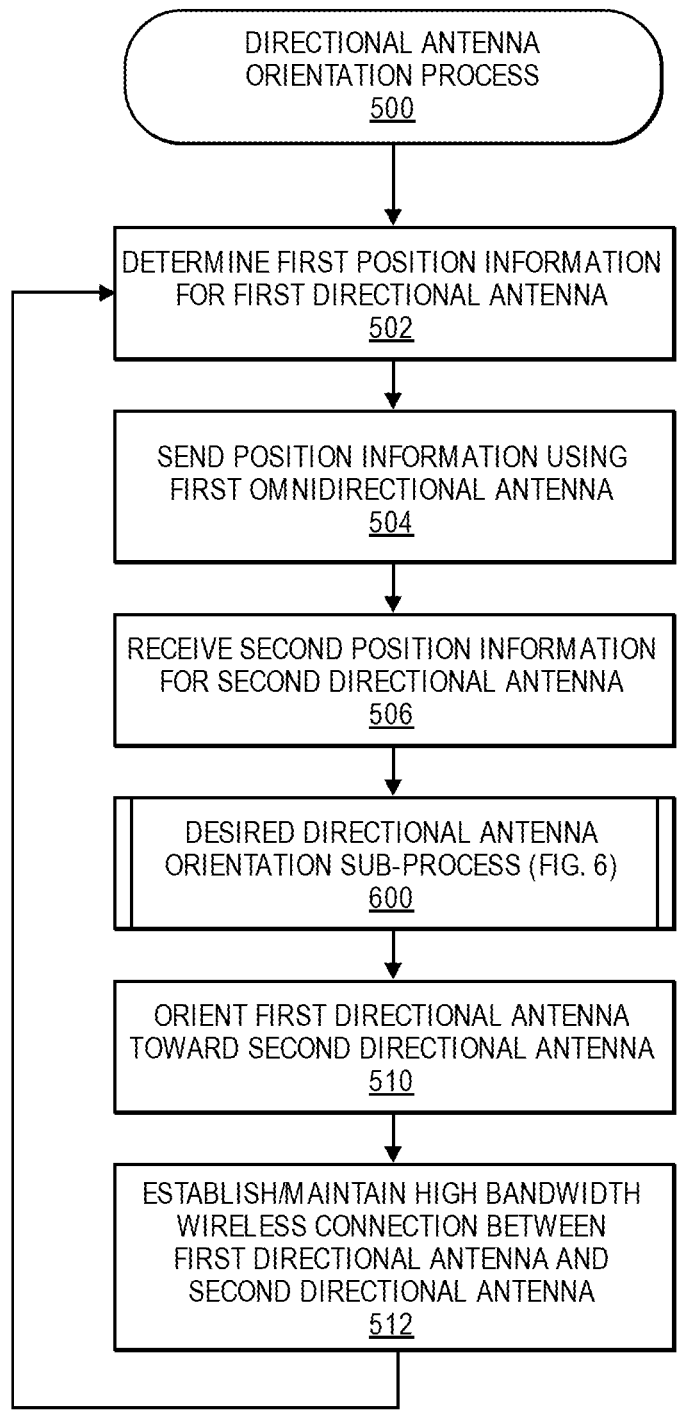
FIG. 5 is a flow diagram illustrating an example process for establishing and maintaining a high bandwidth wireless connection between directional antennas, according to an implementation.

FIG. 5 is a flow diagram illustrating an example process 500 for establishing a high bandwidth wireless connection between two directional antennas when at least one of the directional antennas are moving or movable, according to an implementation. The example process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 may be performed at each directional antenna for which a connection is to be established. For each antenna, the corresponding antenna orientation controller considers the antenna that it is controlling as the first directional antenna and the antenna to which it is to establish or maintain a connection as the second directional antenna. For example, if the wireless connection is to be established between a fixed location directional antenna and a moving directional antenna, the antenna orientation controller that is controlling the orientation of the fixed location antenna will consider the fixed location antenna as the first directional antenna and the moving directional antenna as the second directional antenna. Likewise, the antenna orientation controller that is controlling the orientation of the moving directional antenna will perform the example process 500 to orient the moving directional antenna and will consider the moving directional antenna that it is controlling as the first directional antenna and the fixed location antenna as the second directional antenna.

The example process 500 begins by determining position information for a first directional antenna, as in 502. In some implementations, if the first directional antenna is a fixed location directional antenna, the position information, or at least a portion thereof, may be known because the position of the antenna is fixed. For example, the horizontal coordinates and/or altitude of the fixed location antenna may be maintained in a data store and accessible to the example process 500. Other aspects of the position information of the fixed location antenna, such as the angle of the directional antenna and/or the orientation, may be maintained by the antenna orientation controller that controls the orientation of the fixed location antenna.

If the first antenna is a moving antenna that is coupled to a vehicle, the position information may be determined from the vehicle control system. For example, the vehicle control system may receive GPS information that may be used to determine the horizontal position of the directional antenna coupled to the vehicle. Likewise, the vehicle control system may also include an altimeter that is used to determine the altitude of the directional antenna coupled to the vehicle. The antenna orientation controller may also maintain information relating to the orientation and/or angle of the directional antenna. For example, if the directional antenna is mechanically oriented, it may be initially calibrated to a known position, and each time it is adjusted the antenna orientation controller may update the known orientation of the directional antenna. In comparison, if the directional antenna is electronically oriented, the orientation may be maintained/known to the antenna orientation controller.

The determined position information for the first directional antenna, referred to as the first position information, is then sent using a first omnidirectional antenna that is at or near the location of the first directional antenna, as in 504. In transmitting the first position information, the first position information may include an identification of the first directional antenna and/or the vehicle, or fixed location to which the first directional antenna is coupled, the approximate horizontal position of the first directional antenna, the approximate altitude of the first directional antenna, the approximate orientation of the first directional antenna, the approximate angle of the first directional antenna, and/or a timestamp identifying when the information was determined.

In addition to sending the first position information using the first omnidirectional antenna, second position information is received, as in 506. The second position information corresponds to the second directional antenna with which the first directional antenna is to be oriented. The second position information identifies at least one of the approximate horizontal position of the second directional antenna, the approximate altitude of the second directional antenna, the approximate angle of the second directional antenna, and/or the approximate orientation of the second directional antenna.

Based on the determined position information for the first directional antenna and the received position information for the second directional antenna, the desired directional antenna orientation sub-process is performed, as in 600. The desired directional antenna orientation sub-process 700 is discussed in further detail below with respect to FIG. 7. The desired directional antenna orientation sub-process 700 returns a desired directional antenna orientation.

Based on the returned desired directional antenna orientation, the first directional antenna is oriented according to the desired directional antenna orientation, as in 510. Finally, a high bandwidth wireless connection between the first directional antenna and the second directional antenna is established or maintained, as in 512. For example, if the example process 500 is performed at each directional antenna, the two directional antennas will be oriented so that each is positioned in the main lobe of the corresponding directional antenna. By positioning each of the antennas in the main lobe of the corresponding directional antenna, a high bandwidth wireless connection may be established between the two directional antennas.

Likewise, if the example process 500 has already been performed by each of the directional antennas such that a high bandwidth wireless connection has been established, the example process 500 may be periodically repeated so that the position information for each antenna is updated. Using the updated position information, the orientation of each directional antenna is updated so that the high bandwidth wireless connection between the two directional antennas is maintained. In some implementations, the position information may be continually transmitted and received using wireless connection between omnidirectional antennas. However, in other implementations, once the high bandwidth wireless connection is established between the directional antennas, the position information for the first directional antenna and the position information for the second directional antenna may be transmitted/received using the directional antennas, rather than or in addition to using the omnidirectional antennas. In such an implementation, if the high bandwidth wireless connection is lost, the example process 500 may revert back to transmitting/receiving the position information using the omnidirectional antennas.

Figure 6:
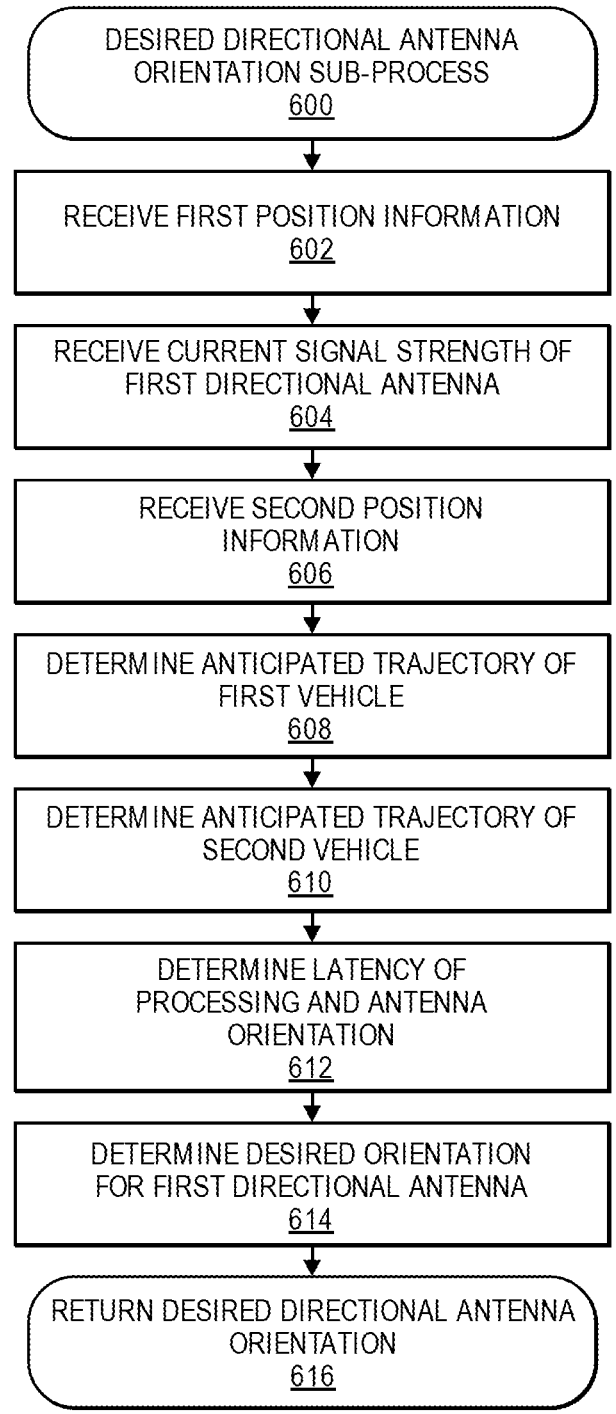
FIG. 6 is a flow diagram illustrating an example sub-process for determining a desired directional antenna orientation, according to an implementation.

FIG. 6 is a flow diagram illustrating an example sub-process 600 for determining a desired directional antenna orientation, according to an implementation. The example sub-process 600 begins by receiving the first position information for the first directional antenna, as in 602. In addition, the current signal strength measured at the first directional antenna may also be determined, as in 604. For example, the signal strength of the signal transmitted from the second directional antenna may be measured at the first directional antenna and used, as discussed below, to further orient the first directional antenna so that it is in the main lobe of the second directional antenna. Likewise, the second position information is also received by the example sub-process 600, as in 606.

Because the example sub-process 600 may be performed each time an antenna orientation is to be performed, the first position information for the first directional antenna coupled to the first vehicle and the second position information for the second directional antenna coupled to the second vehicle may be stored each time it is received and used to determine an anticipated trajectory of each vehicle. For example, as the first position information is received over a period of time, it may be considered collectively to identify an approximate speed, heading, and/or direction of travel of the first vehicle and the coupled first directional antenna and determine an anticipated trajectory of the first vehicle, as in 608. Likewise, the second position information received over a period of time may be used to determine an approximate speed, heading, and/or direction of travel for the second vehicle and coupled second directional antenna to determine an anticipated trajectory of the second vehicle, as in 610.

In some implementations, the latency in performing the example process 500 and/or the example sub-process 600 may be considered along with the time required to execute any commands to orient the first directional antenna, as in 612. For example, if it takes approximately five milliseconds to perform the example process 500 and sub-process 600 and eight milliseconds to complete an orientation of the first directional antenna, a total latency of 13 milliseconds may be determined for the first directional antenna.

Based on the first position information, second position information, determined anticipated trajectory of the first vehicle, determined anticipated trajectory of the second vehicle, and the determined latency, a desired orientation for the first directional antenna is determined, as in 614. For example, rather than attempting to orient the first directional antenna toward the current position of the second directional antenna, the first directional antenna may be oriented toward an anticipated position of where the second directional antenna will be by the time the first directional antenna is actually oriented. For example, if the second directional antenna is traveling in a direction that includes a horizontal component and there is a latency in orienting the first directional antenna, the example sub-process 600 may send instructions to orient the first directional antenna such that it is oriented ahead of the current position of the second directional antenna so that it will be oriented toward the second directional antenna when orientation of the first directional antenna is complete.

In some implementations, in addition to considering the position of the vehicles and/or latency, additional adjustments may be made based on measured signal strength. For example, if the example sub-process 600 has been sending instructions to orient the first directional antenna approximately three degrees ahead of the current position of the second vehicle, it may, over time, alter that amount slightly (e.g., two degrees, four degrees) and determine if the measured signal strength increases or decreases. If the measured signal strength increases, the antenna is oriented closer to the center of the main lobe of the second directional antenna. In comparison, if the signal strength decreases, it can be determined that the adjustment moves the first directional antenna away from the center of the main lobe of the second directional antenna.

Finally, the determined desired directional antenna orientation is returned, as in 616.

Figure 7:
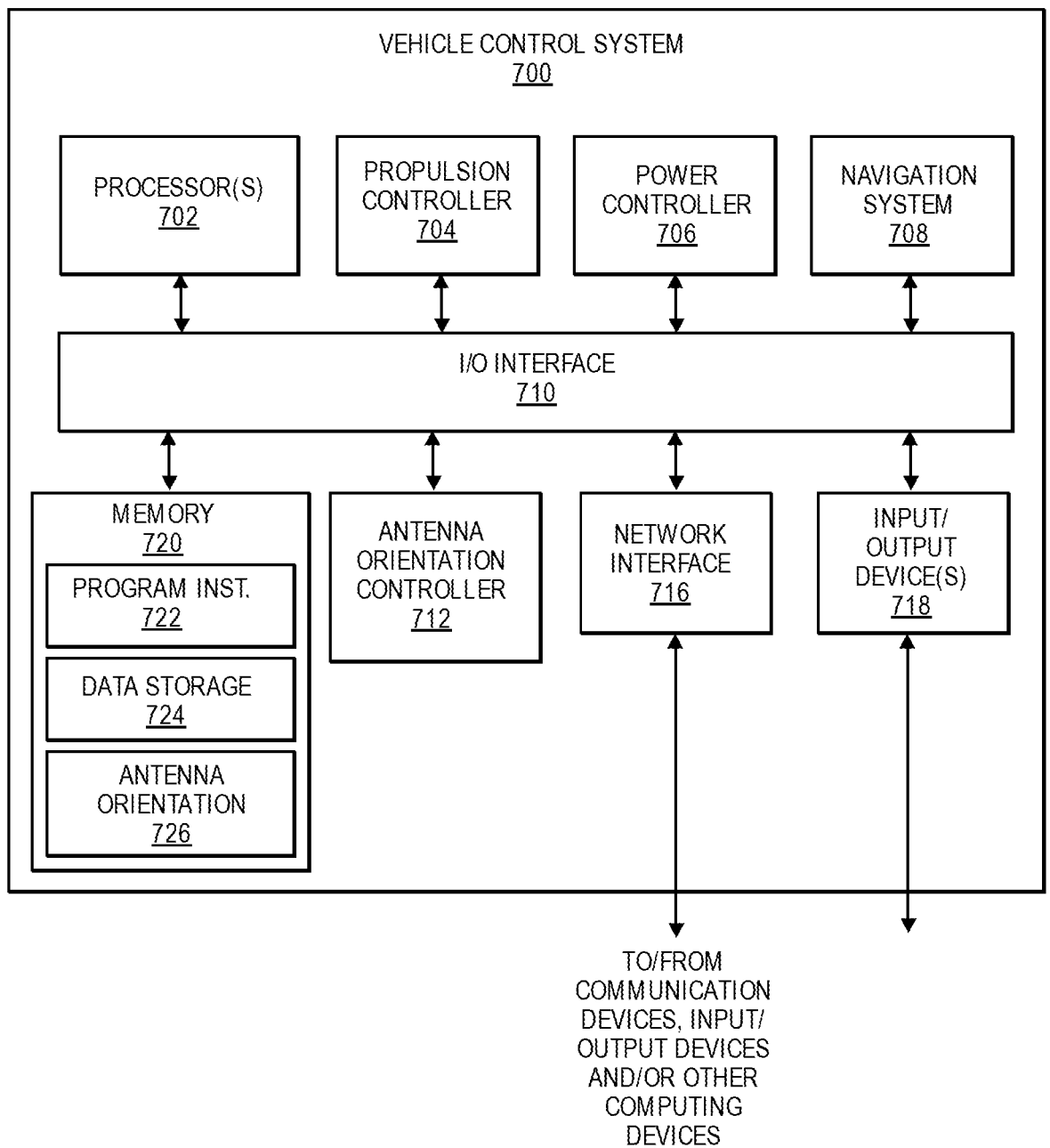
FIG. 7 depicts a block diagram illustrating various components of a vehicle control system, according to an implementation.

FIG. 7 is a block diagram illustrating an example vehicle control system 700, which may be utilized by a vehicle, such as a UAV. In the illustrated implementation, the vehicle control system 700 includes one or more processors 702 coupled to a non-transitory computer readable storage medium 720 via an input/output (I/O) interface 710. The vehicle control system 700 may also include a propulsion controller 704 (e.g., for controlling one or more motors, engines, etc.), a power controller 706 and/or a navigation system 708. The vehicle control system 700 further includes a network interface 716, one or more input/output devices 718, and an antenna orientation controller 712, which is used to orient a coupled directional antenna.

In various implementations, the vehicle control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, travel paths, antenna orientation information, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and antenna orientation 726, respectively. In other implementations, program instructions, data, and/or antenna orientation may be received, sent, or stored upon different types of computer-accessible media, such as non-transitory media, or on similar media separate from the non-transitory computer readable storage medium 720 or the vehicle control system 700. Generally speaking, a non-transitory, computer readable storage medium may include storage media or memory media such as magnetic or optical media, e.g., disk or CD/DVD-ROM, coupled to the vehicle control system 700 via the I/O interface 710. Program instructions and data stored via a non-transitory computer readable storage medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Additionally, in some implementations, some or all of the functionality of the I/O interface 710, such as an interface to the non-transitory computer readable storage medium 720, may be incorporated directly into the processor(s) 702.

The propulsion controller 704 communicates with the navigation system 708 (e.g., for adjusting the power of each propeller motor of the vehicle to guide the vehicle along a determined travel path). The navigation system 708 may include a global positioning system (GPS), indoor positioning system (IPS), or other similar system and/or sensors that can be used to navigate the vehicle to and/or from a location. The antenna orientation controller 712 communicates with the navigation system 708 to obtain position information that is used to determine the horizontal position and/or altitude of the UAV so the horizontal position of the coupled directional antenna can be determined. Likewise, the antenna orientation controller may also control orientation of the directional antenna (e.g., by altering a servo motor and/or through an electronically steerable antenna).

The network interface 716 may be configured to allow data to be exchanged between the vehicle control system 700, other devices attached to a network, such as other computer systems (e.g., remote computing resources 210), and/or with vehicle control systems of other vehicles. For example, the network interface 716 may enable wireless connection between the vehicle and a management system that is implemented on one or more of the remote computing resources. As another example, the network interface 716 may enable traditional wireless connection between numerous vehicles. In various implementations, the network interface 716 may support communication via wireless general data networks, such as a Wi-Fi network. For example, the network interface 716 may support communication via telecommunications networks such as cellular communication networks, satellite networks, and the like.

In some implementations, input/output devices 718 may include one or more displays, imaging devices, thermal sensors, infrared sensors, time of flight sensors, accelerometers, pressure sensors, weather sensors, etc. Multiple input/output devices 718 may be present and controlled by the vehicle control system 700. One or more of these sensors may be utilized to assist in the landing as well as the avoidance of obstacles during flight.

As shown in FIG. 7, the memory may include program instructions 722 that may be configured to implement the example processes and/or sub-processes described herein. The data storage 724 may include various data stores for maintaining data items that may be provided for determining directional antenna orientation. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the vehicle control system 700 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The vehicle control system 700 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated vehicle control system 700. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible storage medium separate from the vehicle control system 700 may be transmitted to the vehicle control system 700 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other vehicle control system configurations.

Figure 8:
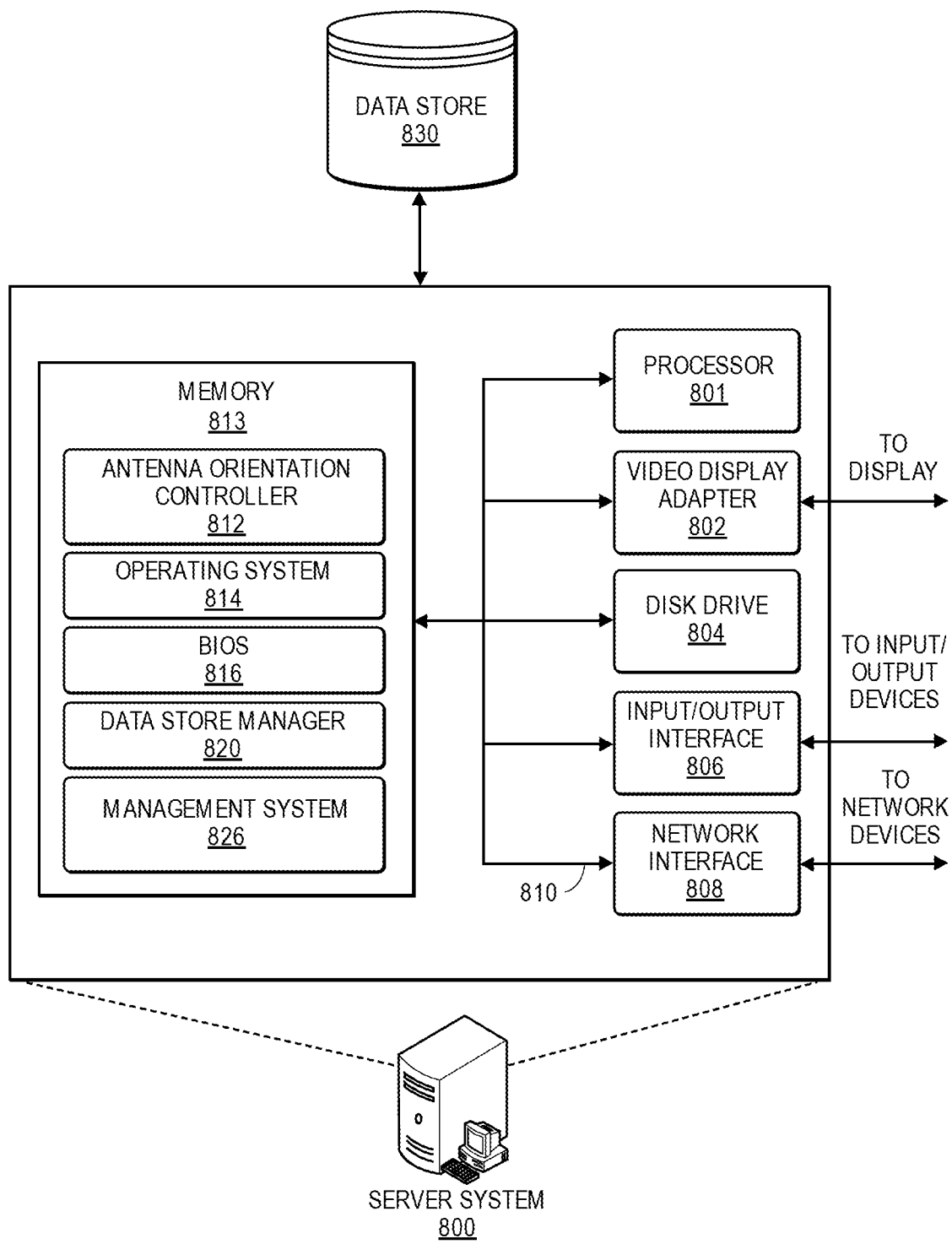
FIG. 8 is a block diagram of an illustrative implementation of a server system that may be used with various implementations.

FIG. 8 is a block diagram of an illustrative implementation of a server system, such as the server system 800, which may be used in the implementations described herein. The server system 800 may include a processor 801, such as one or more redundant processors, a video display adapter 802, a disk drive 804, an input/output interface 806, a network interface 808, and a memory 813. The processor 801, the video display adapter 802, the disk drive 804, the input/output interface 806, the network interface 808, and the memory 813 may be communicatively coupled to each other by a communication bus 810.

The video display adapter 802 provides display signals to a local display (not shown in FIG. 8) permitting an agent of the server system 800 to monitor and configure operation of the server system 800 and/or to provide information (e.g., directional antenna orientation, etc.). The input/output interface 806 likewise communicates with external input/output devices not shown in FIG. 8, such as a mouse, keyboard, scanner, or other input and output devices that can be operated by an agent of the server system 800. The network interface 808 includes hardware, software, or any combination thereof, to communicate with other computing devices. For example, the network interface 808 may be configured to provide communications between the server system 800 and other computing devices, such as that of a vehicle, vehicle management system 700, etc., via a network.

The memory 813 generally comprises random access memory (RAM), read-only memory (ROM), flash memory, and/or other volatile or permanent memory. The memory 813 is shown storing an operating system 814 for controlling the operation of the server system 800. A binary input/output system (BIOS) 816 for controlling the low-level operation of the server system 800 is also stored in the memory 813.

The memory 813 also includes a data store manager 820 that is configured to manage one or more data stores 830. As used herein, the term "data store" refers to any device or combination of devices capable of storing, accessing, and retrieving data, which may include any combination and number of data servers, databases, data storage devices and data storage media, in any standard, distributed or clustered environment. The server system 800 can include any appropriate hardware and software for integrating with the data store 830 as needed to execute aspects of one or more applications for antenna orientation at a remote location, vehicle management system 700, etc.

The data store 830 can include several separate data tables, databases or other data storage mechanisms and media for storing data relating to a particular aspect. For example, the illustrated data store 830 includes mechanisms for maintaining information related to position information for fixed location directional antennas. It should be understood that there may be additional aspects that can be stored in the data store 830 and that additional data stores beyond the one illustrated may be included. The data store 830 is operable, through logic associated therewith, to receive instructions from the server system 800 and obtain, update or otherwise process data in response thereto.

The memory 813 may also include the management system 826 and/or an antenna orientation controller 812 that is used to orient fixed location antennas using the implementations discussed above. The management system 826 and/or the antenna orientation controller 812 may be executable by the processor 801 to implement one or more of the functions of the server system 800. In one implementation, the management system 826 and/or the antenna orientation controller 812 may represent instructions embodied in one or more software programs stored in the memory 813. In another implementation, the management system 826 and/or the antenna orientation controller 812 can represent hardware, software instructions, or a combination thereof.

The server system 800, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to wirelessly transmit digital content, the system comprising:
   a fixed location, including:
      a first directional antenna configured to wirelessly transmit digital content in a first direction;
      a first omnidirectional antenna configured to wirelessly receive first position information from a first vehicle that is aerially navigating at a location remote from the fixed location; and
      a first directional antenna orientation controller configured to orient the first directional antenna based at least in part on the first position information received by the first omnidirectional antenna;
   the first vehicle including:
      a second omnidirectional antenna configured to wirelessly receive second position information from a second vehicle, the second position information including a horizontal position and an altitude corresponding to the second vehicle;
      a second directional antenna configured to wirelessly receive the digital content transmitted from the first directional antenna;
      a second directional antenna orientation controller configured to orient the second directional antenna so that it is oriented toward the first directional antenna and able to receive the digital content while the first vehicle is in motion; and
      a third antenna configured to wirelessly transmit the digital content to the second vehicle so that the digital content is received by a fourth antenna at the second vehicle.

2. The system of claim 1, further comprising:
   the second vehicle, including:

the fourth antenna configured to wirelessly receive the digital content transmitted from the first vehicle, wherein the fourth antenna is a directional antenna;
a third directional antenna orientation controller configured to orient the fourth antenna so that it is able to receive the digital content; and
a fifth antenna configured to wirelessly transmit the digital content to a third vehicle so that the digital content is received by a sixth antenna at the third vehicle.

3. The system of claim 1, wherein the first directional antenna is a directional antenna configured to operate in an industrial, scientific, and medical ("ISM") radio band.

4. The system of claim 1, wherein:
the second directional antenna comprises an electronically steerable antenna.

5. The system of claim 1, wherein the second directional antenna orientation controller comprises a gimbal configured to mechanically orient the second directional antenna.

6. The system of claim 1, wherein the first vehicle is at least one of an unmanned aerial vehicle, an aerial vehicle, an unmanned ground based vehicle, a ground based vehicle, an unmanned water based vehicle, or a water based vehicle.

7. A computer implemented method, comprising:
under control of one or more computing systems configured with executable instructions,
determining first position information of a fixed location, the fixed location including a first directional antenna and a first omnidirectional antenna;
determining second position information of a first vehicle at a second location that is remote from the fixed location, the first vehicle including a second directional antenna and a second omnidirectional antenna;
transmitting, using the second omnidirectional antenna associated with the first vehicle, the second position information so that the second position information is received by the first omnidirectional antenna at the fixed location, the first directional antenna being oriented based at least in part on the first position information and the second position information;
determining, based at least in part on the first position information and the second position information, a desired directional antenna orientation of the second directional antenna so that the second directional antenna is oriented toward and able to wirelessly connect with the first directional antenna;
causing orientation of the second directional antenna according to the desired directional antenna orientation so that the second directional antenna is oriented toward the first directional antenna and able to wirelessly connect with the first directional antenna;
establishing a wireless connection between the first directional antenna and the second directional antenna;
receiving third position information from a second vehicle at a third location that is remote from the fixed location and the second location, the third position information including a horizontal position and an altitude corresponding to the second vehicle; and
establishing a wireless connection between the first vehicle and the second vehicle.

8. The method of claim 7, wherein the first vehicle is moving with respect to the fixed location.

9. The method of claim 7, wherein the first vehicle is at least one of an unmanned aerial vehicle, an aerial vehicle, an unmanned ground based vehicle, a ground based vehicle, an unmanned water based vehicle, or a water based vehicle.

10. The method of claim 7, further comprising:
determining, after the first vehicle has moved, fourth position information of the second directional antenna coupled to the first vehicle; and
transmitting, using the second directional antenna associated with the first vehicle, the fourth position information so that the fourth position information is received by the first directional antenna at the fixed location, the first directional antenna being oriented based at least in part on the first position information and the fourth position information.

11. The method of claim 10, further comprising:
determining, based at least in part on the first position information and the fourth position information, a second desired directional antenna orientation of the second directional antenna so that the second directional antenna is oriented toward and able to maintain the wireless connection with the first directional antenna;
causing orientation of the second directional antenna according to the second desired directional antenna orientation so that the second directional antenna is oriented toward the first directional antenna and able to maintain the wireless connection with the first directional antenna; and
maintaining the wireless connection between the first directional antenna and the second directional antenna.

12. The method of claim 7, wherein determining the first position information of the fixed location comprises receiving known position information associated with the fixed location.

13. The method of claim 7, wherein the second position information includes at least one of an approximate horizontal position of the second directional antenna, an approximate altitude of the second directional antenna, an approximate angle of the second directional antenna, or an approximate orientation of the second directional antenna.

14. The method of claim 13, further comprising:
determining the approximate horizontal position of the second directional antenna using a global positioning system associated with the first vehicle.

15. The method of claim 13, further comprising:
determining the approximate altitude of the second directional antenna using an altimeter associated with the first vehicle.

16. The method of claim 7, wherein the first and second omnidirectional antennas are configured to operate at approximately 900 MHz; and wherein the first and second directional antennas are configured to operate at approximately 5.8 GHz.

17. The method of claim 7, wherein the second directional antenna is oriented toward the first directional antenna using at least one of a gimbal or an electronically steerable antenna.

18. A computer implemented method, comprising:
under control of one or more computing systems configured with executable instructions,
receiving, by a second omnidirectional antenna associated with a fixed location, first position information of a first vehicle, the first position information being transmitted by a first omnidirectional antenna associated with the first vehicle;
determining, based at least in part on the first position information and known position information of the fixed location, a desired directional antenna orientation of a second directional antenna associated with the fixed location so that the second directional antenna is oriented toward and able to wirelessly connect with a first directional antenna associated with the first vehicle;

causing orientation of the second directional antenna according to the desired directional antenna orientation so that the second directional antenna is oriented toward the first directional antenna and able to wirelessly connect with the first directional antenna;

establishing a wireless connection between the first directional antenna and the second directional antenna;

receiving third position information from a second vehicle, the third position information including a horizontal position and an altitude corresponding to the second vehicle; and establishing a wireless connection between the first vehicle and the second vehicle.

19. The method of claim 18, further comprising:

subsequent to establishing the wireless connection between the first directional antenna and the second directional antenna, receiving, by the second directional antenna associated with the fixed location, updated position information of the first vehicle, the updated position information being transmitted by the first directional antenna associated with the first vehicle;

determining, based at least in part on the updated position information and the known position information of the fixed location, an updated desired directional antenna orientation of the second directional antenna associated with the fixed location so that the second directional antenna is oriented toward and able to maintain the wireless connection with the first directional antenna associated with the first vehicle;

causing orientation of the second directional antenna according to the updated desired directional antenna orientation so that the second directional antenna is oriented toward the first directional antenna and able to maintain the wireless connection with the first directional antenna; and maintaining the wireless connection between the first directional antenna and the second directional antenna.

20. The method of claim 19, wherein the updated position information of the first vehicle is received by the second directional antenna from the first directional antenna at least one of continuously or at defined intervals.

21. The system of claim 1, wherein the first omnidirectional antenna is configured to provide long range transmissions at a low bandwidth.

22. The system of claim 1, wherein the first vehicle transmits first position information to the second vehicle and the second vehicle transmits second position information to the first vehicle in an alternating manner.

23. The system of claim 1, wherein the first vehicle holds its position while establishing a wireless connection to wirelessly receive the digital content from the first directional antenna.

* * * * *